Patented Sept. 14, 1943

2,329,505

UNITED STATES PATENT OFFICE 2,329,505

PROCESS OF PURIFYING AND CRYSTALLIZING SALTS

Frederick J. Zimmermann, Wausau, Wis., assignor to Potash Company of America, Denver, Colo., a corporation of Colorado No Drawing. Application July 15, 1940, Serial No. 345,611

12 Claims. (Cl. 23—297)

This invention relates to a process of treating soluble chemical salts, and more particularly relates to controlled crystallization of such salts.

In the manufacture of various chemical salts for use as fertilizers or chemicals, substantial quantities of the product are obtained in the form of particles of less than 80-mesh size. Such fine materials tend to cake on standing and are unpleasant and difficult to handle due to dusting. Also, where used as fertilizers, the presence of substantial quantities of such finely-divided chemical salts makes their application to the soils difficult by reason of the aforementioned dusting condition.

It is an object of the present invention to subject chemical salts, particularly those of the fine size range, to a recrystallization treatment which will increase the particle size and substantially eliminate fines from the composition.

Another object of the invention is to provide a treatment for chemical salts in fine sizes, whereby the final product of such treatment will be a composition of substantially uniform size and grade.

A further object of the present invention is the provision of a treatment which will make a marketable product of extremely fine sizes of chemical salts occurring as dust-like materials.

Still another object of the invention is the provision of a method for the production of large size particles of chemical salts of a high degree of purity.

Other objects reside in novel steps and treatments, which will appear more fully in the course of the following description.

In performing the present process, a soluble chemical salt occurring in finely-divided sizes, for example, predominantly less than 100-mesh and usually having associated with it minor quantities of some other soluble salt as a contaminant or impurity, is taken as the material for treatment. A saturated solution of the composition comprising the final product of the treatment is initially produced and there is then introduced into such saturated solution a quantity of the material in excess of the amount which will enter into solution at the highest temperature at which the resulting pulp will be subjected during the period of treatment.

In order to attain the desired results, it is necessary that the compositions treated shall be those soluble chemical salts that show a substantial increase in solubility with increase of temperature above the normal boiling points of their saturated solutions at atmospheric pressure. Examples of chemical salts particularly amenable to the treatment are potassium chloride, potassium chlorate and sodium nitrate, although many other chemical salts likewise are amenable to the treatment, as will be more specifically set forth hereinafter.

With the aforesaid essentials satisfied by the proper selection of the material for treatment and the production of the saturated solution as aforesaid, it will be apparent that even at the maximum temperatures and pressures of the treatment, some of the material will remain in solid phase in the body of the pulp and such solid constituents act as nuclei for the initiation of crystal formation upon subsequent reduction in temperature.

To this end, the pulp comprising the aforesaid liquid and solid phases is subjected to the heat treatment in a closed vessel to withstand the pressures generated as a result of the heating action and thereby prevent an evaporating action. In dissolving at atmospheric pressure, small quantities of soluble impurities require considerable time to go into solution. At the increased temperature resulting in the added pressure generated, soluble impurities go into solution with much greater rapidity. After heating to the desired degree, the mixture is subjected to a cooling action, with the result that particles of the final product of the treatment form in sizes substantially larger than the original particles of the treatment and of substantially uniform size.

Thereafter, it is only necessary to separate the liquid and solid phases by any suitable method, such as filtering, for example, and the solution so separated may be recirculated to the pulp-forming stage of the operation. The solids content so separated comprises the final product of the treatment.

As a result of the foregoing operating procedure, the treatment will reduce the saturation of the solution with a portion of the salt initially present in liquid phase passing into solid phase at the crystallization stage and being removed from the treatment with the solids content.

This condition serves as a means of purifying the final product whenever the contaminant is a soluble composition, as such soluble material will enter into solution during crystallization to replace the composition passing from the liquid into the solid phase.

While a variety of sizes may be produced as a result of the aforesaid treatment, it is possible in any given operation to so regulate the treatment steps that the final product will be of substantially uniform particle size. The factors responsible for such control are the proportion of solid to solution in the material subjected to treatment, the rate of agitation during the heating stage, and the temperature range employed.

While it is possible to obtain beneficial results in the treatment of such materials where agitation is not employed, it has been found that agitation during both the heating and cooling stages is highly beneficial to the final results and consequently constitutes a preferred mode of operation.

In particular, the agitative action prevents caking of the solid phases and thereby insures sufficient dispersion of the fine particles throughout the liquid body to provide the proper nuclei for initiating particle formation. Further, the agitation serves to provide a more uniform heat exchange.

It also has been discovered that the rate of cooling is not a factor in the particle formation within the usual size range required, and because of this, the preferred operating procedure upon reaching the maximum predetermined temperature is to resort to rapid cooling, inclusive of a sudden release of pressure in the closed container. Preferably, such released vapors are discharged into another container in which heating is progressing, and by so doing, a substantial heat loss is prevented, while the pressure release also serves to prevent incrustations of the salt crystals on the heat exchange surfaces.

This reduction in the cooling interval serves to shorten the treatment time of the operation and thereby increases plant capacity. In this connection, it will be understood that the pressure release into a second container in which heating is progressing serves to give a more rapid heat exchange and consequently shortens the heating interval.

Having thus described the operating procedure of the present invention, reference will be made to certain tests illustrating the efficiency of the present treatment.

In each of the tests shown in the following tabulation, the material taken for treatment comprised a potassium chloride concentrate from a mill in the Carlsbad, New Mexico, field, which analyzed approximately ninety-seven per cent KCl and approximately three per cent impurities consisting chiefly of sodium chloride, but containing some minor inclusions of iron oxide, magnesium chloride and the like. The results of these tests follow:

|  | Test No. | | | | | Filtered fine starting material |
| --- | --- | --- | --- | --- | --- | --- |
|  | A | B | C | D | E |  |
| Pounds solid per gallon of brine | 10.5 | 7 | 6 | 5 | 4 |  |
| Screen analyses accumulative, per cent: |  |  |  |  |  |  |
| +6 |  |  |  |  | 0.2 |  |
| +8 |  |  |  |  | 11.3 |  |
| +10 |  |  |  |  | 47.0 |  |
| +14 | 0.3 | 0.5 |  | 24.8 | 80.0 |  |
| +20 | 0.6 | 1.0 | 0.3 | 59.5 | 92.2 |  |
| +28 | 1.3 | 12.0 | 12.7 | 87.4 | 94.4 |  |
| +35 | 19.3 | 48.6 | 45.8 | 96.1 | 95.8 | 1.70 |
| +48 | 61.3 | 80.6 | 75.1 | 98.5 | 96.8 | 3.75 |
| +65 | 85.9 | 93.6 | 90.6 | 99.5 | 98.2 | 11.05 |
| +100 | 95.5 | 98.2 | 97.0 | 99.8 | 99.2 | 30.95 |
| +150 | 98.2 | 99.5 | 99.0 |  | 99.6 | 53.73 |
| +200 | 99.5 | 99.8 | 99.7 |  | 99.8 | 73.02 |
| +200 | 100.0 | 100.0 | 100.0 | 100.0 | 100.0 | 100.00 |

From the foregoing, it will be observed that while the original solids content of the treatment consisted chiefly of extremely fine sizes, the final product of the treatment consisted principally of particles of uniform size. Further, in operations such as the foregoing, the grade of the product has uniformly improved from a purity of ninety-seven per cent to higher than ninety-nine per cent.

In such an operation, the continued dissolution of the sodium chloride content serves to gradually change the composition of the solution, and where continuous operation is employed, it will be necessary to periodically withdraw the solution, deplete the potassium chloride content thereof and substitute fresh solution in place thereof. By a controlled cooling action, substantially all of the potassium chloride content of the solution may be recovered.

In certain operations, it may not be necessary to change the composition of the material under treatment and where two soluble salts are commingled in such material, the solution may be saturated with respect to both. Under such circumstances, the subsequent heating and cooling action will merely serve to alter particle sizes without changing the grade of the material.

While in the usual operation it is desirable to employ a rapid cooling action, ten to fifteen minutes, for example, it has been discovered that larger crystals can be produced by a slow cooling action. While larger crystals are of no particular value where the production is to be used in the fertilizer business, there may be occasions when such a product is desired. Therefore, the present process may be utilized to produce very large crystals by controlling the cooling action to materially extend its duration.

Due to the fact that the solution or brine is amenable to repeated usage, as previously explained, it is possible to employ the present process in both batch and continuous operations.

The solution separated from the final solids product at the end of the operation is recirculated usually through a storage tank and any depletion in saturation resulting from a given operation is taken care of by the addition of solids into such solution at the head end of the operation.

In this connection, it will be understood that periodic testing is employed to maintain the proper saturations and proper liquids-solids ratio at the head end of the operation. When saturation of the solution drops, more solids will be mixed with the solution for a given treatment, and in this way, saturation during the operation is maintained substantially uniform.

As previously explained, a wide variety of chemical salts is amenable to the present treatment, and for convenience in the description and claims, these salts have been classified as soluble chemical salts, the solubility characteristics of which increase substantially above the normal boiling points at atmospheric pressure.

Various chlorides, chlorates, nitrates, sulfates, and bromides may be used, particularly those of sodium and potassium, but also including magnesium, such as potassium bromide, magnesium chloride and magnesium bromide, for example.

As previously stated, potassium chloride, potassium chlorate and sodium nitrate are particularly amenable to the treatment.

Where insoluble material is included as impurity, it will be understood that the dissolution and recrystallization action will not appreciably affect such constituents, but many of the materials usually classified as insolubles, in reality, are only difficultly soluble, and it will be understood that the relatively long interval of the heat treatment will be sufficient to enter substantial quantities of such material into solution. In the subsequent recrystallization action producing the final product, these constituents will not form in the crystals to any appreciable extent. Consequently, the present process serves as a refining operation, in addition to controlling particle sizes.

While a considerable latitude is provided in the various control steps of the operation, best results have been obtained when the heating interval lasted for from two to five hours with a three to four hour interval as the preferred range.

Similarly, the temperature rise may vary to a considerable degree, but a temperature increase from 100° F. to not more than 600° F. due to the added pressure imposed, will be ample for most treatments and usually a maximum temperature of from 300° F. to 400° F. is sufficient.

In this connection, it will be understood that inasmuch as best results are obtained when there is a relatively small quantity of solids present in the solution at the maximum temperature of the operation, excessive heating requires the presence of unusually large amounts of solids entered into the cold solution at the start of the operation. Therefore, it is necessary in order to determine the best operating procedure for a given treatment to consider the several factors of saturation, solubility characteristics of the final product, maximum temperature to be attained, and liquids-solids ratio, as well as the final particle size desired.

The elimination of contaminating constituents benefits the final product by reducting its tendency to cake during storage and shipment. It is a well-known fact that two or more salts in combination are generally more hygroscopic than either alone and the elimination of any appreciable quantity of the second salt from the salt comprising the final product materially reduces the caking tendency.

Various means may be employed for providing the agitation, the heating action and the cooling action of the operation. It has been found in practice that an autoclave mounted for rotation and exteriorly heated, as by means of an oil flame, is well suited for the purposes of the treatment. Cooling may be accelerated by release of the accumulated pressure, followed by spraying the exterior of the autoclave with water, or, if preferred, merely by atmospheric radiation. Preferably, some means of moving the charge, in addition to the rotation of the body, will be employed, such as lifter blades or projecting fins mounted on the interior walls of the cylinder.

The materials of the treatment may be taken from various sources, for example, the separated fines of a flotation separation, the dusty constituents of storage bins and the like.

As previously explained, the present treatment may be utilized in the production of very large crystals, where desired. A typical illustration is cited. Five pounds per gallon of potassium chloride fines were introduced into a saturated solution of potassium chloride which was progressively heated in an autoclave, sealed from the atmosphere, to a maximum temperature of 200° C. and thereafter subjected to a progressive reduction in temperature for an interval of several hours with crystals forming in sizes as large as ⅜ inch at the completion of the cooling action.

From the foregoing, it is obvious that the present invention affords a wide latitude in the type of product produced to satisfy a variety of conditions. As the factors controlling grain size, namely, (1) proportion of solid material introduced into the solution, (2) the speed of agitation, and (3) the temperature range employed, may be individually varied, any predetermined grain size within the limits indicated herein may be attained by following the methods of the present invention. In all such treatments, the substantial quantities of extremely fine sizes forming the pulp at the beginning of the operation are converted by the process into grains of sufficient size to be usable in the various requirements of commerce.

Changes and modifications may be availed of within the spirit and scope of the invention as defined in the hereunto appended claims.

What I claim and desire to secure by Letters Patent is:

1. A process of treating soluble chemical salts, the solubility of which increases substantially at temperatures above those of their saturated solutions at their normal atmospheric boiling points, which comprises introducing such a chemical salt in finely-divided condition into a saturated solution of such salt to form a pulp, heating such pulp while sealed from the atmosphere under pressures in excess of normal atmospheric conditions to a temperature above the boiling point of its liquid phase at atmospheric pressure but less than the temperature necessary to dissolve all the solids of the pulp, inducing a crystal formation on the solids nuclei remaining at the said higher temperature by cooling the pulp, and separating the resultant solids from the liquid at the completion of the cooling action.

2. A process of treating soluble chemical salts, the solubility of which increases substantially at temperatures above those of their saturated solutions at their normal atmospheric boiling points, which comprises introducing such a chemical salt in finely-divided condition into a saturated solution of such salt to form a pulp, heating such pulp while sealed from the atmosphere under pressures in excess of normal atmospheric conditions to a temperature above the boiling point of its liquid phase at atmospheric pressure, but less than the temperature necessary to dissolve all the solids of the pulp, agitating the pulp during said heating action, inducing a crystal formation on the solids nuclei remaining at the said higher temperature by cooling the pulp, and separating the resultant solids from the liquid at the completion of the cooling action.

3. A process of treating soluble chemical salts, the solubility of which increases substantially at temperatures above those of their saturated solutions at their normal atmospheric boiling points, which comprises introducing such a chemical salt in finely-divided condition into a saturated solution of such salt to form a pulp, in the approximate proportions of four to twelve pounds of the salt per gallon of saturated solution, heating such pulp while sealed from the atmosphere under pressure in excess of normal atmospheric conditions to a temperature above the boiling point of its liquid phase at atmospheric pressure but less than the temperature necessary to dissolve all the solids of the pulp, inducing a crystal formation on the solids nuclei remaining at the said higher temperature by cooling the pulp, and separating the resultant solids from the liquid at the completion of the cooling action.

4. A process of treating soluble chemical salts, the solubility of which increases substantially at temperatures above those of their saturated solutions at their normal atmospheric boiling points, which comprises introducing such a chemical salt in finely-divided condition into a saturated solution of such salt to form a pulp, heating said pulp while sealed from the atmosphere under pressures in excess of normal atmospheric conditions to a maximum temperature between 300° F. and 400° F., inducing a crystal formation on the solids nuclei remaining in the pulp at said maximum temperature by cooling the pulp, and separating the resultant solids from the liquid at the completion of the cooling action.

5. A process of treating soluble chemical salts, the solubility of which increases substantially at temperatures above those of their saturated solutions at their normal atmospheric boiling points, which comprises introducing such a chemical salt in finely-divided condition into a saturated solution of such salt to form a pulp, heating such pulp while sealed from the atmosphere under pressures in excess of normal atmospheric conditions to a temperature above the boiling point of its liquid phase at atmospheric pressure, but less than the temperature necessary to dissolve all the solids of the pulp, exhausting the resulting vapors from the sealed zone, inducing a crystal formation on the solids nuclei remaining at the said higher temperature by cooling the pulp, and separating the resultant solids from the liquid at the completion of the cooling action.

6. A process of treating potassium chloride containing some sodium chloride as an impurity, which comprises introducing such a composition in finely-divided condition into a saturated potassium chloride solution to form a pulp in an autoclave, heating said pulp while sealed from the atmosphere to a temperature above the boiling point of its liquid phase at atmospheric pressure but less than the temperature necessary to dissolve all potassium chloride solids of the pulp, inducing a crystal formation on the potassium chloride nuclei remaining in the pulp at the said higher temperature by cooling the pulp and thereby dissolving the sodium chloride solids, and separating the resultant potassium chloride solids from the liquid phase at the completion of the cooling action.

7. In a process of treating a potassium chloride composition, the improvement which comprises introducing such a composition in finely-divided condition and in a quantity in excess of the amount entering into solution at the maximum temperature of the treatment, into a saturated potassium chloride solution to form a pulp, heating said pulp in an autoclave to a temperature in excess of that attainable at atmospheric pressure, and inducing a crystal formation on undissolved potassium chloride of the heating action by cooling the heated pulp.

8. In a process of treating a potassium chlorate composition, the improvement which comprises introducing such a composition in finely-divided condition and in a quantity in excess of the amount entering into solution at the maximum temperature of the treatment, into a saturated potassium chlorate solution to form a pulp, heating said pulp in an autoclave to a temperature in excess of that attainable at atmospheric pressure, and inducing a crystal formation on undissolved potassium chlorate of the heating action by cooling the heated pulp.

9. In a process of treating a sodium nitrate composition, the improvement which comprises introducing such a composition in finely-divided condition and in a quantity in excess of the amount entering into solution at the maximum temperature of the treatment, into a saturated sodium nitrate solution to form a pulp, heating said pulp in an autoclave to a temperature in excess of that attainable at atmospheric pressure, and inducing a crystal formation on undissolved sodium nitrate of the heating action by cooling the heated pulp.

10. A process of treating soluble chemical salts, the solubility of which increases substantially at temperatures above those of their saturated solutions at their normal atmospheric boiling points, which comprises introducing such a chemical salt in finely-divided condition into a saturated solution of such salt to form a pulp, heating such pulp while sealed from the atmosphere under pressures in excess of normal atmospheric conditions to a temperature above the boiling point of its liquid phase at atmospheric pressure but less than the temperature necessary to dissolve all the solids of the pulp, inducing a crystal formation on the solids nuclei remaining at the said higher temperature by cooling the pulp, separating the resultant solids from the liquid at the completion of the cooling action, and returning the solution so separated to the pulp-forming stage of the operation.

11. In a process of treating soluble chemical salts, the solubility of which increases substantially at temperatures above those of their saturated solutions at their normal atmospheric boiling points, the improvement which comprises introducing such a chemical salt in finely-divided condition and in a quantity in excess of the amount entering into solution at the maximum temperature of the treatment, into a saturated solution of such salt to form a pulp, heating such pulp in an autoclave to temperatures in excess of those attainable at atmospheric pressure, and inducing a crystal formation on undissolved solids of the heating action by cooling the heated pulp.

12. In a process of treating soluble chemical salts, the solubility of which increases substantially at temperatures above those of their saturated solutions at their normal atmospheric boiling points, including the improvement which comprises introducing such a chemical salt consisting principally of particles finer than −80 mesh size into a saturated solution of such salt to form a pulp, heating such pulp while sealed from the atmosphere under pressures in excess of normal atmospheric conditions to temperatures in excess of 200° C. while maintaining some undissolved solids of the salt in dispersed condition in the heated body, and inducing crystal formation in sizes approximating 3/8 inch by progressively cooling the heated mass for an interval in excess of one hour.

FREDERICK J. ZIMMERMANN.